United States Patent
Mickevicz

[15] 3,652,298
[45] Mar. 28, 1972

[54] METHOD FOR PREPARING FREE FLOWING SUGAR PRODUCTS

[72] Inventor: Justin Melvin Mickevicz, Chicago, Ill.

[73] Assignee: Pro-Col Corporation, Chicago, Ill.

[22] Filed: May 7, 1969

[21] Appl. No.: 822,691

Related U.S. Application Data

[63] Continuation-in-part of Ser. No. 530,415, Feb. 28, 1966, abandoned.

[52] U.S. Cl..................................99/141, 162/96, 127/30, 127/63
[51] Int. Cl. ............................................A23l 1/26
[58] Field of Search ..................99/141, 204; 127/29, 30, 63; 162/965

[56] References Cited

UNITED STATES PATENTS 2,430,797   5/1943   Zenzes......................................99/204

Primary Examiner—Raymond N. Jones
Assistant Examiner—Roger B. Andewelt
Attorney—Johnston, Root, O'Keeffe, Keil, Thompson & Shurtleff

[57] ABSTRACT

Free flowing powdered sugar is prepared by grinding together in a dry, solid state a white pulverized sugar component and an additive in the form of water insoluble sugar cane cellulose, beet sugar cellulose and/or edible wood cellulose, using proportions of said additive corresponding to 1.5 to 4.0 percent by weight of the sugar component, the resultant product having an average particle fineness of 200 to 325 mesh.

3 Claims, No Drawings

METHOD FOR PREPARING FREE FLOWING SUGAR PRODUCTS

This application is a continuation-in-part of U.S. application Ser. No. 530,415 filed February 28, 1966 and now abandoned.

BACKGROUND INFORMATION

Powdered white sugar of the type used in confections has such a fine particle size that the particles tend to agglomerate or adhere to each other and to other surfaces. This tendency makes it difficult to properly proportion and otherwise use such products. Additives have been employed in an effort to overcome these objections.

Usually powdered sugar consists generally of white cane or beet sugar which has been pulverized and to which corn starch in the ratio of 97 parts of the powdered sugar component to 3 parts, by weight, of the corn starch component is added. Such powdered sugar is used as a dusting sugar for doughnuts and cakes, and as the bulk component of frostings, and may be used with or without flavoring materials and other additives such as butter, cocoa, chocolate, liquor, coconut shreds, and the like, for use in making food products.

The additive heretofore commonly used in connection with such powdered sugar in corn starch, which has been used as a non-caking additive since it is substantially white, relatively odor free, and inexpensive and it is commonly co-pulverized from granular form with the sugar at the refinery.

Unlike brown sugar, or so-called "soft" sugars, which cake under dry conditions or conditions of relatively low humidity, white sugars cake under conditions of relatively high humidity and while corn starch is found generally suitable as a non-caking additive for such powdered white sugars, it has some disadvantages and among these are (1) the fact that it is water wettable (swellable); (2) it tends to clog up and otherwise interfere with sugar recovery systems involving the reprocessing of sugar dust or powder resulting from powdered sugar grinders; (3) when used in a powdered icing it has a tendency to absorb water and to take on the form of a heavy viscous mass; and (4) at boiling temperatures it tends to gelatinize.

Zenzes, U.S. Pat. No. 2,430,797, discloses a process in which and edible aqueous liquid such as sugar cane juice is mixed with sufficient quantities of dry materials such as dry bagasse to absorb the moisture and the resultant dry product is comminuted. Additional powdered bagasse can be added. The difficulty with this process is that it requires relatively large proportions of load material and the products assume the properties of the additive. In the case of dehydrated fruits and vegetables smaller proportions of additive are used, apparently because of the properties peculiar to these substances.

OBJECTS

An object of this invention is to provide a new and improved free flowing powdered sugar containing only a small amount of additive and not subject to the objectionable characteristics of powdered sugar containing starch as an additive.

Another object of the invention is to provide a new and improved free flowing powdered sugar containing such a small amount of additive which is free from objectionable properties that the presence of the additive does not impart objectionable characteristics to the sugar product.

Another object of the invention is to provide a new and improved powdered white sugar which is superior in quality to white powdered sugar embodying starch as an additive, and which in use overcomes the undesirable qualities imparted to powdered white sugar by the corn starch additive heretofore employed in the art.

A further object of the present invention is to provide a new and improved powdered white sugar which is non-caking and which employs an additive which is relatively inexpensive but which renders the white sugar component free flowing.

Another object of the present invention is to provide a new and improved powdered white sugar product embodying a new and improved non-caking additive in the form of cellulose derived from sugar cane or bagasse (spent cane) or in the form of cellulose derived from sugar beets, or in the form of edible wood cellulose. Other objects will appear hereinafter.

INVENTION

In accordance with the invention new and improved free flowing powdered sugar is prepared by intimately grinding together in a dry, solid state a white pulverized sugar component and an additive in the form of an edible water insoluble sugar cane cellulose, beet sugar cellulose and/or wood cellulose, using proportions of said additive corresponding to 1.5 to 4.0 percent by weight of the sugar component, the resultant product having an average particle fineness of 200 to 325 mesh.

Typical powdered white sugar products embodying the present invention may be prepared in accordance with any of the following examples and within the ranges and proportions specified.

EXAMPLE 1

To 25 pounds of white sugar (American Crystal Sugar Company) (beet sugar) was added with mixing 0.375 pound of an additive in the form of bleached bagasse sugar cane cellulose prepared according to one of the processes described hereinafter, or other suitable process, the additive, in this instance, being equal to approximately 1.5 percent by weight of the beet sugar component. The mixture of the white sugar component and the additive were then ground in a suitable hammer mill embodying a 0.027 round hole perforated screen or, if desired, the mixing and grinding can be done simultaneously in one operation. The end product thus prepared typically has a particle size of about 200 to 300 mesh.

Other typical examples which may be employed in preparing the new powdered white sugar products, in accordance with the practice of the present invention are as follows:

EXAMPLE 2

The same procedure was followed as in Example 1 except that in this instance 0.50 (one-half) pound of the additive (sugar cane bagasse cellulose) was employed, equal to 2 percent by weight of the white beet sugar component.

EXAMPLE 3

The same procedure was followed as in Example 1 except that in this instance 0.75 pound of the additive was employed, equal to 3 percent by weight of the white beet sugar component.

EXAMPLE 4

The same procedure was followed as in Example 1 except that in this instance 1 pound of sugar cane bagasse cellulose was employed, equal to 4 percent by weight of the white beet sugar component.

EXAMPLE 5

To 25 pounds of white sugar (American Crystal Sugar Company) (beet sugar) was added, with mixing 0.375 pound of an additive in the form of edible wood cellulose in the form of SOLKA FLOC BW 200 (Brown Company); the additive, in this instance, being equal to approximately 1.5 percent by weight of the white beet sugar component. The mixture of the white beet sugar component and additive was then ground in a suitable hammer mill embodying 0.27 round hole perforated screen or, if desired, the white sugar component and the additive may be simultaneously mixed and ground in one operation. The end product thus prepared had a particle size of about 200 to 300 mesh.

EXAMPLE 6

The same procedure was followed as in Example 5 except that in this instance 0.50 pound of additive was employed equal to 2 percent by weight of the white beet sugar component.

EXAMPLE 7

The same procedure was followed as in Example 5 except that in this instance 0.75 pound of the additive was employed, equal to 3 percent by weight of the white beet sugar component.

EXAMPLE 8

The same procedure was followed as in Example 5 except that in this instance 1 pound of the additive was employed, equal to 4 percent by weight of the white beet sugar component.

The materials prepared as in the foregoing examples 1 to 8, inclusive, were tested against controls in the form of the comparable powdered white sugars employing starch as an additive by storing them in open trays in a temperature control cabinet operating continuously at 80° F. and at a relative humidity of 60 percent, for a period of 1 week. At the end of 1 week the new powdered sugar products made in accordance with the foregoing Examples 1 to 8, inclusive, and embodying the additive in a range of from 1.5 to 4 percent by weight of the additive, relative to the weight of the white sugar component, exhibited relatively little and an unobjectionable degree of caking, whereas the powdered sugar products employing starch as the additive, in the lower area of the stated range of the additive, exhibited a tendency toward an objectionable degree of soft caking at the end of the test.

It has been found in the practice of the present invention that the workable useful range in which the aforesaid additives may be employed in making the new confectioner's powdered white sugar products is within a range of from not substantially less than 1.5 percent to not substantially more than 4 percent of the additive, by weight, of the white sugar component, and that about 3 percent is the optimum percentage of the additive which should be employed in making the new powdered white sugar products.

Moreover, it has been found that if the additive is employed in a quantity less than 1.5 percent of the white sugar component, by weight, caking occurs, whereas if the additive is employed in excess of 4 percent by weight of the white sugar component, the resulting powdered white sugar product tends to take on or assume, to an objectionable degree the characteristics of the additive and to depart from or lose the desired characteristics of the powdered white sugar products.

The new powdered sugar products of the present invention have a number of desirable advantages and characteristics over prior art white powdered sugar products, which have employed starch as an additive, including (1) the fact that it has a lower calorie content, (2) it is cheaper to manufacture in that bagasse sugar or sugar cane cellulose and beet sugar cellulose are waste products in the sugar industry, and (3) it is relatively easier to cook in syrups than prior powdered white sugars which have employed corn starch as an additive in that the new cellulose additives are water insoluble and do not hydrate as does corn starch.

A typical method which may be employed in preparing sugar cane cellulose for use as an additive in the manufacture of the new powdered white sugar products is illustrated in the following example:

EXAMPLE 9

2 pounds of sugar cane stalks are cut, in any suitable manner, as by means of a jig saw tool, into suitable lengths such, for example, as ¼-inch pieces or discs. Cold water is then added to a Waring blender and a portion of the cut up sugar cane stalk material is then added to the blender and mashed and blended for a period of about 60 seconds, whereupon the slurry thus formed is dumped into a cooking pot. This operation is repeated by the addition of cold water and cut up sugar cane stalk material to the Waring blender until 13 pints of cold water have been added to the Waring blender and all of the cut up sugar cane stalk material has been ground up. The slurry of water and sugar cane stalk material thus formed is then cooked for 20 minutes in water at boiling temperature, whereupon the material thus treated is removed and washed with cold water on a 40-mesh screen, and then dried for 16 hours at a temperature of 120° F., preferably on steel trays in an electric oven. The product at this point resembles sawdust in appearance, and is in approximately one-fourth-inch lengths depending upon the length of the pieces as initially made from the sugar cane stalk.

The procedure referred to in the foregoing Example 9 for cutting the sugar cane stalks into suitable small lengths is merely illustrative of many ways in which the sugar cane stalks may be divided including shredding, crushing, chopping, and the like.

The dried sugar cane product thus formed is then reduced to about 200- to 300-mesh size, using a No. 5 Mikroatomizer machine, and this may be accomplished in a one pass operation, although an operation involving several passes is more effective.

However, in actual commercial practice the spent sugar cane or bagasse would either be ground wet, that is, containing about 50 percent or less water, or it may be dried. In either case, it would be boiled in water and then washed several times with water, and if desired, bleached with edible bleaches, whereupon it would be centrifuged to expel excess water, and then pre-chopped and pulverized in a wet condition. During the pulverizing or grinding operation the grinder would evaporate the water of the wet bagasse while the bagasse is being reduced to a fine flour.

A typical example of another method which may be followed in preparing sugar cane cellulose from sugar cane bagasse for use as an additive in the practice of the present invention is as follows:

EXAMPLE 10

10 pounds of freshly squeezed sugar cane from which most of the sugar content had been removed was boiled for 30 minutes in 5 gallons of water. The resulting sterilized bagasse was then tray dried, chopped and pulverized in a hammer mill. 3 pounds of the resulting sugar cane cellulose thus prepared was then ground with 100 pounds of white sugar (sucrose) to form the new powdered sugar product which contains a quantity of the sugar cane cellulose in an amount equal to 3 percent of the sugar cane cellulose component, by weight. The resulting white pulverized sugar product exhibited no caking and compared favorably with powdered white sugar products embodying the same relative quantity of starch as an additive.

In the practice of the present invention, and with particular reference to the foregoing Example 10, it has been found that if fresh bagasse is subjected to the action of boiling water, as above, or to the action of steam, under pressure, or to a mixture of boiling water and steam, and then (optionally) dried, before being pulverized, it is sterilized and will not turn black as bagasse tends to do if it is not thus sterilized. This black discoloration of unsterilized fresh bagasse is believed to be due to bacterial and/or enzymatic action upon the residual sucrose and other materials, in such bagasse, which has not been sterilized, and such bacterial and enzymatic action causes the bagasse, and the sugar cane cellulose derived therefrom, to assume an objectionable dark brown or black color.

It has also been found that depending, in part, upon the quality of the bagasse used, and also depending, in part, upon whether or not the sugar cane field from which the sugar cane has been derived, had been preburned to rid the tops of the sugar cane stalks of dried leaves, it may be desirable to bleach the bagasse. This is particularly true in those instances in which the edible sugar cane cellulose to be derived therefrom is to be added to white sugar since when so used the sugar cane cellulose cannot have an objectionable dark color, whereas in those instances in which the edible sugar cane cellulose is to be added to "soft" or brown sugars such a dark color may not be objectionable. Such bleaching operations may be done in several ways and typical examples are set forth in the following Examples 11, 12 and 13.

EXAMPLE 11

Sugar cane stock which had been subjected to and was laden with dust and moisture, as a result of stormy weather, was selected, and approximately 10 pounds of crushed bagasse from sugar cane stock was cooked in 5 gallons of water to which was added 3 ounces of a commercial soap which was composed essentially of tetrasodium pyrophosphate and sodium hexametaphosphate. The crushed bagasse was boiled in the soap solution for 30 minutes and then washed in boiling water, to preserve its sterile condition, and then dried, chopped and pulverized. The resulting product was a white sugar cane cellulose. A white confectioner's sugar was then prepared by mixing and grinding 100 pounds of white cane sugar with 3 pounds of the edible sugar cane cellulose thus prepared, in the ratio of 3 percent of the edible sugar cane cellulose relative to the powdered white cane sugar component, by weight.

EXAMPLE 12

Sugar cane bagasse from sugar cane stock laden with dust and moisture was soaked in a dilute hydrochloric acid solution, having a pH of approximately 2.0, then rinse treated with a commercial soap solution, as described in the foregoing Example 11. The sugar cane bagasse thus treated was then washed in boiling water, to eliminate undesirable foreign matter while, at the same time, thus eliminating certain undesirable waxes which are present in the sugar cane. The edible sugar cane cellulose thus recovered was pulverized. Three pounds of the sugar cane cellulose thus prepared was then added to 100 pounds of pulverized white can sugar in the ratio of 3 percent of the edible sugar cane cellulose, prepared in accordance with this Example 12, relative to the powdered white cane sugar component, by weight.

EXAMPLE 13

120 grams of dark bagasse was immersed in approximately 4,000 grams of water in a stainless steel container; the pH of the solution being about 5.0 at approximately from 3 to 4 percent consistency (the ratio of pulp to water at a particular time). Chlorine gas was then bubbled into the bagasse-water mixture, through a rubber tube at a very slow rate, and the addition of the chlorine gas to the bagasse-water mixture was stopped when the pH of the solution reached 2.0, whereupon the mixture was allowed to stand for 15 hours. The bagasse-water mixture thus treated was then washed with water several times to remove excess chlorine gas and to remove any hydrochloric acid formed by the introduction of the chlorine gas into the water solution. 50 grams of sodium hydroxide was then dissolved in water and the solution added to the chlorinated washed bagasse. The resulting mixture was then heated to a temperature of 150° F. for 2 hours. The pH of the resulting mixture was approximately 13.0. This mixture was then washed with water until its pH reached 11.0. 60 grams of calcium hypochlorite was then dissolved in water and the calcium hypochlorite solution thus prepared was then added to the alkaline-treated bagasse mixture, prepared as above, whereupon the mixture thus prepared was allowed to stand for 8 hours, at which time its pH was approximately 11.0. The mixture thus prepared was then washed with water and dried in an oven at 150° F. The resulting product was a near white sugar cane bagasse cellulose which, when ground, was usable as an additive in the preparation of the new powdered white sugar products of the present invention.

In the practice of the present invention, and in making the new powdered white sugar products, edible beet sugar cellulose may also be employed, and a typical example which may be followed in preparing the new powdered white sugar products, employing beet sugar cellulose, is set forth in the following examples.

EXAMPLE 14

An edible beet sugar cellulose was prepared by grinding in a hammer mill a quantity of beet sugar cellulose, as received from a beet sugar mill, in a dried condition, and then regrinding it with white sugar (sucrose). A powdered white sugar product of the present invention was then prepared by intimately mixing and grinding 100 pounds of white beet sugar with 1.5 pounds of the beet sugar cellulose thus prepared in a ratio of 1.5 percent of the beet sugar cellulose relative to the powdered white sugar component, by weight.

The powdered white sugar product thus prepared was equal in quality to white powdered sugar products employing starch, in its resistance to caking, while, at the same time, being otherwise at least equally as desirable.

In some instances, it may be desirable to sterilize the beet sugar cellulose to resist its decomposition by bacterial and/or enzymatic action, and subsequent discoloration, and this may be done as described above in connection with the treatment of sugar cane bagasse. In addition, it may also be desirable, at times, to bleach or lighten the color of the sugar beet cellulose, and this may be done in the manner set forth for the bleaching of sugar cane cellulose, as described in any of the foregoing Examples 11, 12 and 13.

EXAMPLE 15

The same procedure was followed as in Example 14 except that in this case 2 pounds of the additive was employed, equal to 2 percent of the white beet sugar component, by weight.

EXAMPLE 16

The same procedure was followed as in Example 14 above except that in this instance 3 pounds of the additive was employed, equal to 3 percent by weight of the white beet sugar component.

EXAMPLE 17

The same procedure was followed as in Example 14 above except that in this instance 4 pounds of the additive was employed equal to 4 percent, by weight, of the white beet sugar component.

EXAMPLE 18

The same procedure was followed as in Example 14 except that in this instance cane sugar was employed in place of beet sugar and in the same amount.

The additives referred to in the foregoing examples may be used interchangeably with the different forms of the white sugar component and in the same quantities of the additive relative to the white sugar component.

It will thus be seen from the foregoing description, that the present invention provides new and improved white sugar products, and additives therefor, and a new and improved method of making the same, and thus has the desirable advantages and characteristics and accomplishes its intended objects including those hereinbefore pointed out and others which are inherent in the invention.

The expression "free flowing" as used herein refers to a product in which the sugar crystals will roll in a particulate flow across a smooth surface, showing complete absence of particle agglomeration or adherence to each other and complete absence of a tendency to adhere to the surface.

The invention is hereby claimed as follows:

1. The method of preparing a free flowing, finely divided sugar product which comprises simultaneously intimately mixing and grinding in a dry, solid state a white sugar component and an additive selected from the group consisting of edible water insoluble sugar cane cellulose and beet sugar cellulose, the quantity of said additive being 1.5 to 4.0 percent by weight of said sugar component, and said product being ground to an average particle size within the range of 200 to 325 mesh, said sugar cane cellulose additive being prepared from sugar cane bagasse by crushing the sugar cane; subjecting the crushed sugar cane to the action of one or more materials selected from the group consisting of hot water and steam to extract therefrom as a sugar-water solution any residual sucrose in the bagasse and to soften the fiber content thereof and to sterilize the cellulose component of the crushed sugar cane to prevent its decomposition by bacterial or enzymatic action; removing the sucrose solution from the solid residue of the thus treated bagasse; and then finely dividing said residue; and said sugar beet cellulose additive being prepared from sugar beet pulp by crushing the sugar beet pulp; subjecting the sugar beet pulp to the action of one or more materials selected from the group consisting of boiling water and steam to extract any residual sucrose therefrom as a sugar-water solution and to soften the fiber content of the sugar beet pulp; removing the sugar-water solution from the solid residue of the sugar beet pulp; and then finely dividing said residue.

2. A method as claimed in claim 1 in which said additive is said edible water insoluble sugar cane cellulose.

3. A method as claimed in claim 1 in which said additive is said sugar beet cellulose.

* * * * *